United States Patent [19]
Ammler et al.

[11] Patent Number: 6,133,647
[45] Date of Patent: Oct. 17, 2000

[54] CIRCUIT LAYOUT FOR A SERIAL TRANSMISSION AND RECEPTION INTERFACE IN PARTICULAR FOR A VEHICLE OCCUPANT PROTECTION SYSTEM AS WELL AS A PROCEDURE FOR CONTROLLING THIS INTERFACE

[75] Inventors: Manfred Ammler, Bergheim; Christian Lehrach, Nackenheim, both of Germany

[73] Assignee: DaimlerChrysler AG, Stuttgart, Germany

[21] Appl. No.: 09/281,090

[22] Filed: Mar. 30, 1999

[30] Foreign Application Priority Data

Apr. 3, 1998 [DE] Germany .............................. 198 15 012

[51] Int. Cl.[7] .............................. H04J 15/00; G08C 19/00
[52] U.S. Cl. .......................................... 307/10.1; 340/825
[58] Field of Search ...................................... 307/9.1, 10.1, 307/112, 113, 116, 125, 130; 340/825, 825.03, 825.04, 825.16, 825.17, 825.94, 825.95, 825.96; 370/240, 248, 250, 357, 360

[56] References Cited

U.S. PATENT DOCUMENTS

| | | |
|---|---|---|
| 5,132,905 | 7/1992 | Takai et al. . |
| 5,311,170 | 5/1994 | Wachi et al. ........................ 340/825.03 |
| 5,321,394 | 6/1994 | Carlton et al. ...................... 340/825.03 |
| 5,608,269 | 3/1997 | Fendt et al. ............................... 307/9.1 |
| 5,726,887 | 3/1998 | Spies et al. ............................. 307/10.1 |
| 5,729,204 | 3/1998 | Fackler et al. ...................... 340/825.04 |
| 6,038,210 | 3/2000 | Kim ..................................... 340/825.16 |

FOREIGN PATENT DOCUMENTS

| | | |
|---|---|---|
| 3942661 | 7/1990 | Germany . |
| 196 43 013 | 2/1998 | Germany . |
| 196 53 794 | 7/1998 | Germany . |

OTHER PUBLICATIONS

"On–board–Diagnose im Fahrzeug"; Design & Electronik 24, Nov. 19, 1991, by H. Senninger, pp. 132, 134, 135.

*Primary Examiner*—Albert W. Paladini
*Assistant Examiner*—Roberto Rios
*Attorney, Agent, or Firm*—W. F. Fasse; W. G. Fasse

[57] ABSTRACT

The invention relates to a circuit layout for a serial transmission and reception interface, in particular for a vehicle occupant protection system, as well as a procedure for controlling the same. Existing central units, in particular vehicle occupant protection systems, featured in most cases separate serial transmission and reception interfaces for the various modules to be connected, causing costs to increase whenever an additional diagnosis module is to be connected. By means of a switchable circuit layout for the interface, this will be connected either to a communication module or to the diagnosis module. The circuit layout is particularly simple and space-saving, being set up by means of diode switches, and preferably features a potential tapping point for automatic switchover into diagnosis mode.

5 Claims, 3 Drawing Sheets

CIRCUIT LAYOUT FOR A SERIAL TRANSMISSION AND RECEPTION INTERFACE IN PARTICULAR FOR A VEHICLE OCCUPANT PROTECTION SYSTEM AS WELL AS A PROCEDURE FOR CONTROLLING THIS INTERFACE

BACKGROUND OF THE INVENTION

The invention relates to a circuit layout for a serial transmission and reception interface, in particular for a vehicle occupant protection system, as well as a procedure for controlling this interface.

From the state of the art, for instance DE 196 43 013 or DE 196 53 794, a large number of vehicle occupant protection systems, in particular for motor vehicles, are known where a central unit is connected to a communication module, e.g. for a sensor arrangement, via a serial transmission and reception interface.

Based on the information determined by the sensor arrangement and passed to the central unit by the communication module, the central unit will decide on the triggering of vehicle occupant protection devices, e.g. air bags, belt tensioners, etc.

In order to determine the operational condition of such a vehicle occupant protection system, e.g. for repair and maintenance purposes, it is necessary to be able to make appropriate evaluations by means of a diagnosis module within the central unit.

SUMMARY OF THE INVENTION

The invention provides a circuit layout for a serial transmission and reception interface by means of which such a diagnosis module can be connected as simply and economically as possible. In addition, a procedure for controlling such a serial transmission and reception interface will be stated.

The basic idea of the invention is to connect the diagnosis module via the same serial transmission and reception interface and to link the central unit, via the multiplex operation circuit layout according to the invention, either with the communication module or with the diagnosis module. However, in order to implement such a multiplex operation as economically as possible, experience shows that it is better to use the circuit layout according to the invention, which is based on a diode logic, rather than a functionally equivalent multiplexer. Here, tristate outputs of the central unit will generate four control signals by means of which the circuit layout is controlled. At the same time, it will also be monitored whether a diagnosis module is switched on and active; if this is the case, switchover from the communication module to the diagnosis module takes place. Below, the invention will be elucidated further by means of embodiment examples and figures.

DESCRIPTION OF THE PREFERRED EMBODIMENTS

Figure 1:
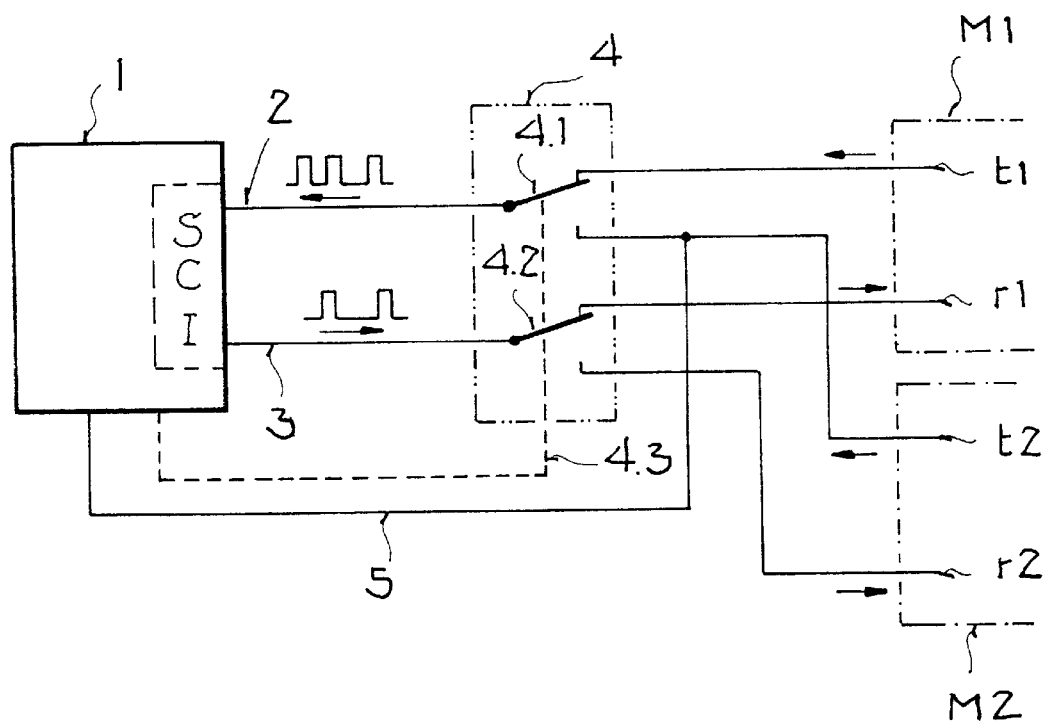
FIG. 1 Block diagram for describing the effect of selecting the circuit layout complete with a multiplexer shown as an equivalent circuit diagram for the circuit layout, FIG. 2 Design of the circuit layout, FIG. 3 Overall layout of central unit complete with communication and diagnosis module.
Figure 2:
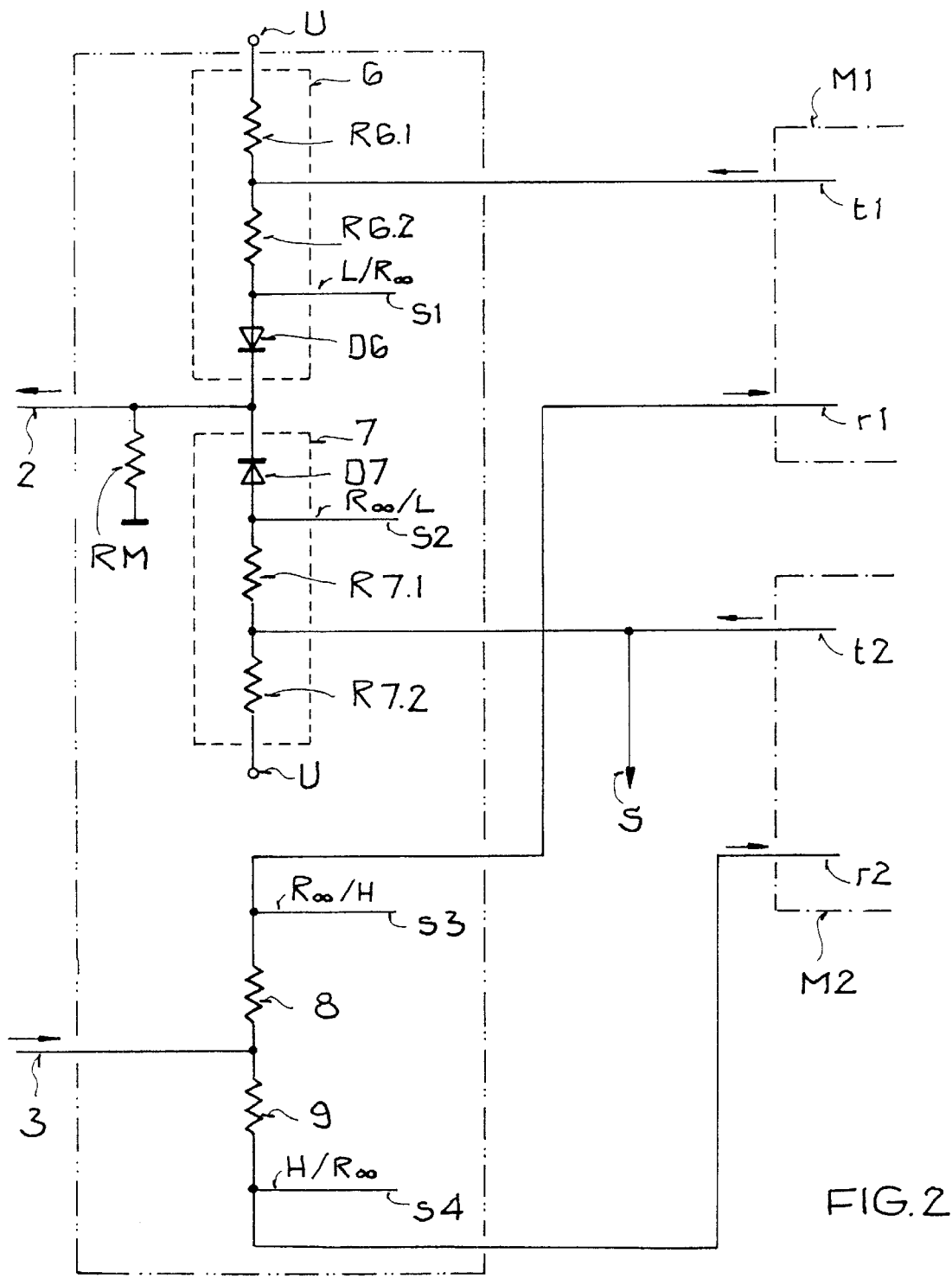

FIG. 1 shows, in a block chip, the central unit 1 complete with the serial transmission and reception interface (SCI) which can be connected, via the reception line 2 and the transmission line 3 and via the multiplexer 4, to the communication module M1 or the diagnosis module M2. An equivalent circuit diagram of the circuit layout according to the invention has been used showing the multiplexer 4 with the switches 4.1 and 4.2 in order to illustrate and elucidate more clearly the way in which the circuit layout operates; the switches 4.1 and 4.2 are controlled from the central unit 1 by means of the control signals 4.3. The implementation of the circuit, however, is shown in FIG. 2. By means of the multiplexer 4 and its switches 4.1 and 4.2 it is easiest to illustrate the basic principle of operation; in accordance with this illustration, the reception line 2 of the central unit 1—depending on the switch state of the switches 4.1 and 4.2 controlled by the central unit 1—is either connected to the transmission output T1 of the communication module M1 or, in the other switch state, to the transmission output T2 of the diagnosis module M2. Analog to this, the transmission line 3 of the central unit—depending on the switch state of the switch 4.2—is connected either to the reception input R1 of the communication module M1 or to the reception input R2 of the diagnosis module M2. FIG. 1 already shows the possibility 5 of interrogating the potential at the transmission output T2 of the diagnosis module M2, where the potential serves as indicator to the central unit 1, whether the diagnosis module M2 transmits any signals. Then, the central unit 1 can switch over the switches 4.1 and 4.2 of the multiplexer 4 by means of the control signals 4.3.

The exact design of the circuit layout according to the invention is now shown in FIG. 2. Here, the reception line 2 and the transmission line 3 are shown as seen from the central unit. The reception line 2 of the central unit 1 is connected to the transmission output T1 of the communication module M1, via a first diode switch 6. The diode switch 6 features a diode D6 which, with its cathode, is connected to the reception line 2 of the central unit 1, as well as a voltage divider made up of the partial resistors $R_{6.1}$ and $R_{6.2}$ to the supply voltage U. The transmission output T1 of the communication module M1 is connected between the first partial resistor $R_{6.1}$ and the second partial resistor $R_{6.2}$. The diode switch 6 is controlled by means of the first control signal S1 which is supplied to the anode of the diode D6. Symmetrically to this, the second diode switch 7 is built up accordingly, complete with the partial resistors $R_{7.1}$ and $R_{7.2}$ and the diode D7, and the transmission output T2 of the diagnosis module M2 is connected between the partial resistors $R_{7.1}$ and $R_{7.2}$. In addition, interrogating the potential 5 is possible by connecting the central unit 1 between these partial resistors $R_{7.1}$ and $R_{7.2}$.

For the purpose of data exchange between the central unit 1 and the communication module M1, the first control signal S1 will be set to a high resistance state and the second control signal S2 to a low-voltage state; this will block the second diode switch 7 whilst the first diode switch 6 will conduct the signals from the transmission output T1 of the communication module M1. The diode D6 will be connected in conducting direction whilst the diode D7 is connected in non-conducting direction. For data exchange between the central unit 1 and the diagnosis module M2, the first control signal S1 will be set to a low-voltage state and the second control signal S2 to a high resistance state; this causes the first diode switch 6 to block whilst the second diode switch 7 conducts the signals from the transmission output T2 of the diagnosis module M2.

The voltage dividers $R_{6.1}/R_{6.2}$ and $R_{7.1}/R_{7.2}$ are selected here in accordance with the signal level voltages required. Thus, it has proven to be particularly advantageous for interrogating the potential 5 by the central unit 1 to select the partial resistor $R_{7.2}$ relative to the supply voltage U to be smaller (4.7 kΩ for example) than the partial resistor $R_{7.1}$ in order to enable the voltage drop across the partial resistor $R_{7.2}$ to be detected for interrogating the potential 5, even with a relatively low driver capacity of the transmission output T2.

Naturally, it is in principle also possible to interrogate the potential of communication module M1, in analogy to the way it is done for the diagnosis module M2, and—if necessary—also to change the control priority.

The transmission line 3 of the central unit 1 is respectively connected to the reception inputs R1 and R2 of the communication module M1 or the diagnosis module M2, via two decoupling resistors 8 and 9. From the transmission line 3, following the decoupling resistors 8 and 9, the control signals S3 and S4 are connected in, respectively, such that these will each act on the reception inputs R1 and R2 of the communication module M1 and the diagnosis module M2 but will not interact mutually with each other or with the transmission line 3. For data exchange between the central unit 1 and the communication module M1, the third control signal S3 will be set to the high resistance state and the fourth control signal S4 to the high-voltage state; this causes the reception input R2 of the diagnosis module M2 to be fixed at high level which means its quiescent condition whilst the reception input R1 of the communication module M1 adopts the current signal of the signal line 3 from the central unit 1. In reverse, appropriately, for data exchange between the central unit 1 and the diagnosis module M2, the third control signal will be set to the high-voltage state and the fourth control signal will be set to a high resistance state; this causes the reception input R1 of the communication module to be fixed at high level which means its quiescent condition whilst the reception unit R2 of the diagnosis module M2 adopts the current signal of the transmission line 3 from the central unit 1.

Due to the simple setup, using elementary components, this circuit layout can be implemented at significantly lower cost than pure multiplexer assemblies; and, by making skillful use of available free space, this circuit layout can even be arranged more compactly—and, that is, if necessary, distributed—on a printed circuit board.

Figure 3:
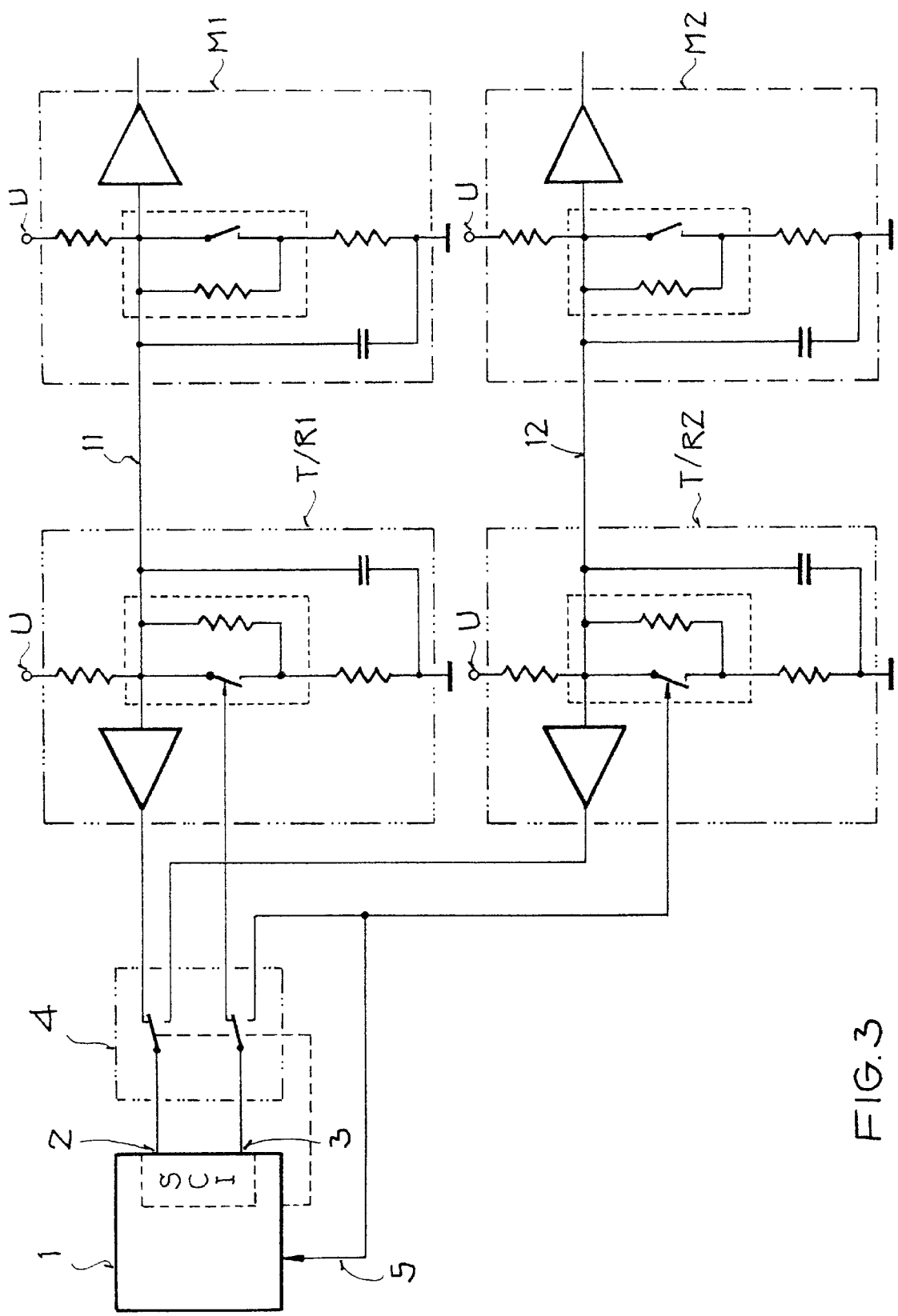

In contrast, FIG. 3 now shows the overall arrangement of the central unit 1 as well as the communication module M1 and the diagnosis module M2, which are respectively connected to a transceiver T/R1 and T/R2—via the connection lines 11 and 12—which link the reception inputs (R1, R2) and the transmission outputs (T1, T2) with these bidirectional connection lines 11 and 12. Again, in accordance with FIG. 2, the circuit layout is shown as a multiplexer equivalent circuit 4 where the multiplexer is driven from the central unit via the signal lines S1 to S4. The central unit 1 is again connected to the transmission output T2 of the diagnosis module M2, via the potential tapping point 5. The transceivers T/R1 and T/R2, as well as the connection lines 11 and 12, and the corresponding transceiver assemblies in modules M1 and M2 provide for a spatial distribution of the communication module M1 and the diagnosis module M2 within the vehicle, with the diagnosis module M2 also being connected in—for instance by means of a connector—only when required, e.g. when the vehicle is at the garage for routine servicing. Here, only a single connection line 11 or 12 will be required, respectively, if this is operated bidirectionally. In addition, the central unit 1 can be controlled via a common serial transmission and reception interface SCI; this causes the costs for this central unit 1 to be significantly reduced when compared with the use of several serial interfaces or even several central units. Interrogating the potential at point 5 enables the central unit 1 to provide for a switchover between the transmission and reception lines (2 and 3).

What is claimed is:

1. A circuit layout for a serial transmission and reception interface of a central unit from a vehicle occupant protection system, by means of which interface digital signals are exchanged with a communication module via a transmission line and a reception line, characterized in that via the same serial transmission and reception interface, an additional diagnosis module can be connected, in that the central unit features additional tristate outputs for four control signals, in that the reception line of the central unit is connected to a transmission output of the communication module via a first diode switch which can be activated by means of a first control signal, and in that the reception line of the central unit is connected to a transmission output of the diagnosis module via a second diode switch which can be activated by means of a second control signal, and in that the transmission line of the central unit is connected to a reception input of the communication module, via a first decoupling resistor, and to a reception input of the diagnosis module, via a second decoupling resistor, with a third control signal being applied from the transmission line, following the first decoupling resistor, and a fourth control signal being applied following the second decoupling resistor.

2. A circuit layout according to claim 1 wherein the diode switches each feature a diode which, respectively, is connected to the reception line of the central unit by means of its cathode, with this line being connected to ground via a high resistance resistor in order to make sure of the signal levels required, and where the respective control signal is supplied to the anodes of the diodes, as well as a voltage divider whose one partial resistor is connected to the anode and whose other partial resistor is connected to a supply voltage, and with a transmission output being respectively connected between the partial resistors.

3. A circuit layout according to claim 2 wherein the voltage divider of the diode switch—which is connected to the transmission output of the diagnosis module—is connected, in between the partial resistors, to a potential tapping point used by the central unit.

4. A procedure for controlling a serial transmission and reception interface of a central unit from a vehicle occupant protection system, by means of which serial transmission and reception interface digital signals are exchanged with a communication module via a transmission line and a reception line, characterized in that via the same serial transmission and reception interface, an additional diagnosis module can be connected, in that the central unit features additional tristate outputs for four control signals, in that the reception line of the central unit is connected to a transmission output of the communication module via a first diode switch which can be activated by means of a first control signal, and in that the reception line of the central unit is connected to a transmission output of the diagnosis module via a second diode switch which can be activated by means of a second control signal, and in that the transmission line of the central unit is connected to a reception input of the communication module, via a first decoupling resistor, and to a reception input of the diagnosis module, via a second decoupling resistor, with a third control signal being applied from the transmission line, following the first decoupling resistor, and a fourth control signal being applied following the second decoupling resistor, wherein, a) for data exchange between the central unit and the communication module, a1) the first control signal is switched into a high resistance state and the second control signal is set to the low-voltage state, causing the second diode switch to block while the first diode switch remains conductive, a2) the third control signal is set to a high resistance state and the fourth control signal to a high-voltage state, causing the reception input of the diagnosis module to be fixed at high level which means its quiescent condition while the reception input of the communication module adopts the current signal of the transmission line from the central unit, b) and wherein, for data exchange between the central unit and the diagnosis module b1) the first control signal is set to the low-voltage state and the second control signal is switched into a high resistance state, causing the first diode switch to block while the second diode switch remains conductive, b2) the third control signal is set to the high-voltage state and the fourth control signal is switched into a high resistance state, causing the reception input of the communication module to be fixed at high level which means its quiescent condition while the reception input of the diagnosis module adopts the current signal of the transmission line from the central unit.

5. Procedure according to claim 4 wherein the central unit changes over from data exchange with the communication module to data exchange with the diagnosis module if the central unit detects an agreed signal via the potential tapping point on the voltage divider for the diagnosis module.

* * * * *